Dec. 30, 1947. J. K. ROBERTS 2,433,482
METHOD FOR PREVENTING BUILD-UP OF LIGHT GASES
IN A PARAFFIN ISOMERIZATION PROCESS
Filed Dec. 15, 1941

Inventor:
Joseph K. Roberts
By Donald H. Dickey
Attorney

Patented Dec. 30, 1947

2,433,482

UNITED STATES PATENT OFFICE 2,433,482

METHOD FOR PREVENTING BUILD-UP OF LIGHT GASES IN A PARAFFIN ISOMERIZATION PROCESS

Joseph K. Roberts, Flossmoor, Ill., assignor to Standard Oil Company, Chicago, Ill., a corporation of Indiana Application December 15, 1941, Serial No. 422,982

12 Claims. (Cl. 260—683.5)

This invention relates to an improved process and apparatus for the isomerization of light paraffinic hydrocarbons by means of an aluminum halide-hydrocarbon complex activated by hydrogen halide and under considerable hydrogen pressure.

An object of my invention is to provide an improved system for the conversion of light paraffinic napthas to isoparaffinic naphthas. Another object of my invention is to provide an improved method for the efficient utilization of an activator in a reaction activated by a hydrogen halide. A further object is to provide improved methods and means for recovering and reintroducing activators in an isomerization process. A further object is to provide improved means for venting light hydrocarbon gases from a continuous aluminum chloride isomerization system without appreciable losses of hydrogen chloride. Other objects and advantages will become apparent as the detailed description of my invention proceeds.

When my invention is applied to refinery naphthas I first fractionate the naphthas to remove undesirable components; for the isomerization of a charging stock consisting essentially of $C_5$—$C_6$ hydrocarbons, for instance, it is desirable to remove substantially all of the heptanes and to have relatively low concentrations of aromatics and naphthenes. At least a substantial part of the charging stock is employed for absorbing hydrogen chloride from gases produced in the system, and this is an important feature of my process. Another part of the charging stock may be employed for making up a slurry of fresh aluminum chloride, although recycled products may serve this purpose. The part of the charge containing hydrogen chloride is passed through a heat exchanger and is then introduced into a reactor. Make-up aluminum chloride and hydrogen are also added to the reactor.

The reactor is operated at a temperature within the approximate range of 100 to 400° F., preferably 200 to 300° F., at a pressure within the approximate range of 100 to 3000 pounds per square inch, preferably 500 to 1500 pounds per square inch. For $C_5$—$C_6$ hydrocarbons I have found that excellent results are obtainable at a temperature within the approximate vicinity of 250° F. and a pressure within the approximate vicinity of about 850 to 900 pounds per square inch.

The amount of hydrogen required will vary somewhat with temperature, pressure and hydrogen chloride concentration in the reaction zone, ranging from about 20 cubic feet per barrel of stock charged at low temperatures, low pressures and low hydrogen chloride concentrations to 200 or more cubic feet per barrel at high temperature, pressures and hydrogen chloride concentrations. For optimum conditions of operation on $C_5$—$C_6$ hydrocarbons the actual hydrogen consumption will be about 100 cubic feet per barrel and in order to insure the presence of the requisite amount of hydrogen in the reactor I prefer to introduce about 100 to about 300, preferably about 200 cubic feet of hydrogen per barrel of charging stock.

The amount of make-up aluminum chloride may be within the approximate range of .1 to 4 pounds per barrel of total charging stock, usually within the approximate range of 1 to 2 pounds per barrel. The amount of hydrogen chloride may be within the approximate range of 5 to 30 pounds of hydrogen chloride per barrel of total stock charged, usually within the general vicinity of 8 or 10 pounds per barrel but only a small portion of the hydrogen chloride is actually consumed so that the major portion of it will be recovered and reintroduced as will be hereinafter described.

While the materials introduced into the reactor with the charging stock are aluminum chloride, hydrogen chloride and hydrogen, the effective catalyst in the reactor is an aluminum chloride-hydrocarbon complex which may contain more or less dissolved or uncombined aluminum chloride. At the beginning of an operation I prefer to have the reaction towers at least about half full of said complex although said complex may be formed in situ by the combination of hydrocarbons with aluminum chloride in the presence of hydrogen chloride. The fresh complex is relatively non-viscous and has a specific gravity about twice as great as that of the charging stock so that when charging stock is introduced at the base of the reactor it flows as a dispersed phase upwardly through said complex, thus effecting intimate contact between the charging stock and the complex. The incoming charging stock is mainly in the liquid phase but it may be partially vaporized by the gaseous hydrogen, about half of the volume of the upflowing stream being gaseous because of the introduced hydrogen which serves the function of promoting turbulence and effecting intimate mixing of charging stock and complex. Based on stock charged and the total amount of complex in the reactor the space velocity should be within the approximate range of .2 to 4 volumes of liquid feed per hour per volume of complex in the reactor, preferably about ½ to 2 volumes of feed per hour per volume of complex.

In the upper part of the reactor sufficient settling space is provided for permitting separation of complex from the clear reaction products. To insure adequate settling I either increase the cross-sectional area of the upper part of the reactor or provide a separate chamber of large horizontal cross-sectional area. The clear products are then passed through a cooler to a low pressure settling chamber for the release of hydrogen chloride and dissolved catalyst.

By separating the catalyst at reduced temperature and pressure the catalyst can be returned directly to the reactor as a complex or slurry. The gases containing hydrogen chloride are recycled and scrubbed by a portion of the charging stock for recovering the hydrogen chloride. The substantially catalyst-free products may be charged to a hydrogen chloride stripper and thence to a fractionation system.

I have found that a considerable amount of hydrogen chloride may be recovered from the products in a simple stripping column which is operated at a pressure of about 200 pounds per square inch, a top temperature in the approximate range of 100 to 150° F. and a bottom temperature in the approximate range of 300 to 400° F. This stripper may be operated under such conditions as to take substantially all of the hydrogen chloride overhead while removing with the liquid any condensibles that might otherwise tend to build up in the system. The final products therefrom are neutralized with caustic, water washed and fractionated or stabilized.

I may employ a multi-stage reaction system, the first stage being with relatively spent complex at relatively high temperature and the second step with relatively fresh complex at a lower temperature. Complex from the low temperature stage may be transferred to the high temperature stage. Substantially constant complex activity may be maintained in each zone by the addition of active materials thereto and the withdrawal of relatively spent catalyst therefrom. Hydrogen chloride may be recovered from the spent catalyst by treatment with water or sulfuric acid.

The invention will be more fully understood from the following detailed description of a specific example thereof read in connection with the accompanying drawing which forms a part of this specification and which is a diagrammatic flow sheet of my improved process as applied to a 5000 barrel per day isomerization plant for $C_5$—$C_6$ hydrocarbons.

About 5000 barrels per day of light naphtha is charged by pump 10 through heat exchanger 11 to an intermediate point of light naptha fractionator 12. This fractionator is provided with conventional heating means 13 at its base and is operated under such conditions that pentanes and hexanes are taken overhead while heptanes and heavier hydrocarbons are withdrawn from the base of the column through line 14. The hexanes, pentanes and any butanes that may be present are taken overhead through line 15 and cooler 16 to reflux drum 17. A portion of the reflux condensate is returned by pump 18 through line 19 to the top of the fractionator to serve as reflux. When substantially butane-free charging stock is desired the rest of the reflux condensate may be withdrawn from the system through line 20 and 20a. In this case the pentanes and hexanes are withdrawn as a separate fraction (diagrammatically illustrated as a side stream) by pump 21 through cooler 22, about 90% or more of this stream being introduced through line 23 to the top of absorber 24 and the rest of the stream (or a pretreated or recycled stream) being introduced through line 25 to aluminum chloride slurry tank 26. I may, however, leave any butanes in the charging stock so that the side stream draw-off is unnecessary. For example, about 900 barrels per day or more of reflux condensate may be introduced through lines 27 and 23 to the top of the absorber and about 100 barrels per day or less of the reflux condensate may be introduced through line 28 and line 25 to slurry tank 26.

The hydrogen chloride required for the reaction is absorbed in at least the major portion of the feed stock before it is introduced into the reactor. The hydrogen chloride absorber may be about 1½ feet in diameter by 28 feet high and it may operate at a pressure of about 100 to 300, for example about 200 to 250 pounds per square inch. A stream of hydrogen chloride gases from the system is introduced at the base of this absorber through line 29. Make-up hydrogen chloride may be introduced through line 30. Instead of make-up hydrogen chloride I may employ chlorine, an alkyl chloride or other substance which will supply the necessary hydrogen halide activator under reaction conditions. I prefer, however, to employ hydrogen chloride and to generate it if necessary in a separate generator.

The hydrogen chloride generator 31 may be of any known type. The chlorine supplying agent introduced through line 32 is preferably chlorine gas although it may be sodium chloride, 22° muriatic (hydrochloric) acid or other halogen containing reagent. The hydrogen supplying agent introduced through line 33 may be hydrogen gas, a hydrocarbon, sulfuric acid, etc. Thus hydrogen and chlorine may be burned in generator 31 to supply hydrogen chloride. Wax tailings or other hydrocarbons may be introduced through line 33 and chlorinated by chlorine gas introduced by line 32 to produce hydrogen chloride and chlorinated hydrocarbons (additional hydrogen chloride may of course be obtained from the latter). Sodium chloride or hydrochloric acid may be introduced through line 32 and sulfuric acid through line 33 but in my system this hydrogen chloride generator operates under such pressure that no compressors are required for introducing the hydrogen chloride through line 34 to the base of absorber 24 and this hydrogen chloride does not require the purification which is generally necessary even for the production of commercial grades of hydrochloric acid. By-products from the hydrogen chloride generator are withdrawn through line 35.

The hydrogen chloride picked up in absorber 24 should be sufficient to give an amount of hydrogen chloride in the stock entering the reactors within the approximate range of 2% to 10%, i. e., in the general vicinity of 5% by weight based on stock charged. Most of this hydrogen chloride may be obtained by gases from line 29. Unabsorbed gases such as small amounts of hydrogen, methane, etc. are purged from the system through line 36, thus eliminating not only gaseous impurities from line 29 but also gaseous impurities from line 34.

The hydrogen chloride-rich charging stock from the base of absorber 24 is pumped by pump 37 through heater 38, through lines 39 and 40 to the base of first reactor 41 at a pressure within the approximate range of 500 to 1500 pounds per square inch, for example about 850 or 900 pounds per square inch. Hydrogen from source 42 (or from other sources that will be hereinafter described) is introduced by compressor 43 and line 44 into line 39 in amounts within the approximate range of 100 to 300, for example about 200 cubic feet per barrel of stock charged to the reactor (the hydrogen being measured at 60° F. and atmospheric pressure). Aluminum chloride from source 45 is introduced through suitable feeding means 46 into slurry tank 26 at such a rate that the amount of aluminum chloride in the slurry is about one or two pounds per gallon. Based on total charging stock introduced into the reactor, the amount of aluminum chloride introduced through line 39 by pump 47 and line 48 is within the approximate range of .1 to 4 pounds, preferably about 1 or 2 pounds per barrel of charging stock. The stream entering reactor 41 through line 40 may be at a temperature within the approximate range of 200° F. to 300° F., for example about 250° F. Preferably the make-up aluminum chloride is introduced in a separate stream through line 48a to avoid line plugging at or near the point where the slurry meets the hydrogen chloride-charging stock stream.

Reactor 41 may be a vertical tower. When the reaction is initiated this reactor may be about half filled with an aluminum chloride-hydrogen chloride-hydrocarbon complex, the density of which is within the approximate range of 1.2 to 1.7 but which may be maintained during the reaction within the general vicinity of 1.5 by methods hereinafter described. The density of the liquid hydrocarbon charging stock is less than half that of the complex. The charging stock is chiefly in the liquid phase but some of it will be vaporized by the upflowing gases which constitute about one-half the volume of the upflowing stream and which produce turbulence and intimate mixing in the reaction tower. The space velocity should generally be within the approximate range of .2 to 4 volumes of liquid charging stock per hour per volume of complex in the reactor or reactors and under preferred operating conditions with a single reactor it should be within the general vicinity of one volume of liquid charging stock per hour per volume of catalyst complex in the reactor. Higher space velocities will, of course, be employed in an individual reactor, when a plurality of reactors are employed in series.

Catalyst complex settles from the upflowing reaction products in the top of the tower and if desired the tower top may be enlarged to provide increased settling area. I prefer, however, to withdraw the reaction products from the tower top through lines 49 and 50 to a soaking drum or warm settling chamber 51 which may be a horizontal or slightly inclined drum. I have discovered that there is a large amount of dissolved catalyst in the products at this point and this dissolved catalyst in a soaking zone may have a beneficial effect on product distribution. In other words, the isomerization equilibrium in drum 51 is not the same as in reactor 41 and this supplemental contact with dissolved catalyst in drum 51 may contribute to additional formation of desired isomerization products. The complex carried into the soaking zone is often as fluid as freshly prepared complex, i. e. it may be quite different in its properties than the average complex in the initial reactor.

Drum 51 also serves the important function of removing any undissolved complex, the separated complex being withdrawn from the base of the drum through line 52 and returned without necessity of pumping. Complex removal at this point helps to prevent fouling of the heat exchanger when clear products are withdrawn through line 53, through cooler (heat exchanger) 54 and pressure reduction valve 55 to the cool settling drum 56 which is maintained at a temperature of about 100° F. or less and at a pressure within the approximate range of 100 to 300, for example about 200 to 250 pounds per square inch. The cool settler may be a horizontal or slightly inclined drum. Released gases leave the top of the cool settler 56 through line 57 which discharges into line 29. The reduced pressure and cooling effects a considerable precipitation of catalyst material in the cool settler and the precipitated catalyst material is withdrawn as a slurry from the base of this settler by means of pump 58 in line 59.

The clear product which is now substantially free from catalyst and which contains only a small amount of hydrogen chloride is withdrawn through line 60 and introduced by pump 61 into hydrogen chloride stripping tower 62 which may be a column about 3 feet in diameter and about 33 feet in height. This stripping column may be provided with heating means 63 at its base and it may be operated at a pressure of about 200 to 250 pounds per square inch with a top temperature within the approximate range of 100 to 150° F. and a bottom temperature within the approximate range of 300 to 400° F. The removed hydrogen chloride together with released gases such as hydrogen, methane, etc. is taken overhead through line 64 to line 29. Condensibles that might otherwise build up in the system are removed with the liquids from the base of the stripper.

The liquid from the base of the stripper is introduced at a low point in scrubbing tower 65 either directly through line 66 or through a cooler 67. Scrubber 65 may be a tower provided with suitable baffles, trays or bubble plates for effecting intimate contact of the upflowing products with a concentrated caustic solution introduced through line 68. The upflowing neutralized products are washed free from caustic in the upper part of the tower by water introduced through line 69. Spent caustic solution is withdrawn from the base of the scrubber through line 70. The wash water may be withdrawn from a trapout plate above the point of caustic inlet if desired.

The water washed product may be withdrawn as such through line 128 or it may pass from the top of scrubber 65 through line 71 and heat exchanger 72 to an intermediate point in stabilizer 73. This stabilizer is provided with conventional heating means 74 at its base. Butanes and any lighter products may be taken overhead through line 75 through cooler-condenser 76 to reflux drum 77 from which gases may be vented through line 78. Condensed reflux may be returned by pump 79 through line 80 to the top of stabilizer 73. A stream consisting of a mixture of normal and isobutanes may be withdrawn from the system through line 81.

If desired a single "isomate" fraction may be withdrawn from the base of the stabilizer through heat exchanger 72 and line 82. We may, however, withdraw only the heaviest isomate at this point and we may withdraw a light isomate as a separate fraction (diagrammatically shown as a side stream) through line 83. The isomate may be fractionated to insure the removal of any heptanes or heavier products which may be formed and to obtain a product of desired Reid vapor pressure for blending in desired amounts with isooctane to make a super aviation fuel. A representative analysis of isomate produced in this system may be approximately as follows:

|  | Per cent by volume |
|---|---|
| Isobutane | 2 |
| Isopentane | 31 |
| n-Pentane | 5 |
| Cyclopentane | 3 |
| 2-methyl pentane | 18 |
| 3-methyl pentane | 8 |
| 2-2-dimethyl butane | 20 |
| 2-3-dimethyl butane | 2 |
| n-Hexane and heavier | 11 |

If neohexane is a desired end product it may be separately fractionated and the other isohexanes may be recycled for the production of further amounts of neohexane.

Returning to the reaction system, I may employ a second reactor 84. Products from the first reactor instead of going to the warm settler 50 may pass through line 85 and heat exchanger 86 into the base of this second reactor 84. The operating conditions in the combined reactors may be substantially the same as in the single reactor operation although I prefer to operate the second reactor at a lower temperature than the first reactor. Thus with the first reactor at 300° F. or more the second reactor may be at about 250° F. Products from the top of the second reactor pass through line 87 to the soaking drum or warm settler 51 as hereinabove described.

Instead of operating the reactors in series they may be operated in parallel by passing only a part of the charging stock through line 40 to the first reactor and by passing the remainder of the charging stock through line 88 to the base of the second reactor. By means of this arrangement one reactor may be on-stream while another reactor is standing by for repair or replacement of catalyst complex.

In general the complex becomes more viscous with age and up to a certain point the catalyst becomes more active with this increasing viscosity. These characteristics are apparently determined to a certain extent by the hydrocarbon content of the complex. Fresh complex may contain up to about 37% hydrocarbon but when complex is made in situ in the presence of a large amount of aluminum chloride and after catalyst has been used for a period of time it may contain only 10 or 15% hydrocarbons, the balance consisting chiefly of aluminum chloride. The catalytic activity of the complex may be maintained substantially constant by withdrawing a portion of the catalyst from the base of the reactors at about the same rate as an additional amount of aluminum chloride is added thereto either in the form of relatively fresh complex or in the form of an aluminum chloride slurry. Thus catalyst from the second reactor may be withdrawn through line 89 by means of pump 90 and either introduced through lines 91 and 92 to the first reactor, withdrawn from the system through line 93, or introduced through line 94 to hydrogen chloride recovery drum 95. Catalyst from the base of the first reactor may be withdrawn through line 96 by means of pump 97 and introduced through line 98 to the second reactor, withdrawn from the system through line 99 or passed to the hydrogen chloride recovery drum through line 100. If the second reactor operates at a lower temperature than the first reactor when in series therewith, I prefer to introduce catalyst from the second reactor through lines 91 and 92 to the first reactor and to remove catalyst through line 100 from the first reactor to the hydrogen chloride recovery drum 95. For such operation I prefer to introduce a part or all of the make-up aluminum chloride slurry from line 48 to the second reactor through bypass line 101 or 101a.

Settled catalyst complex from the soaking drum or warm settler 51 may be passed from line 52 through line 102 to slurry tank 26, or through lines 103 and 98 to second reactor 84 or through lines 104 and 92 to first reactor 91. Catalyst slurry from cool settler 56 may be passed from line 59 through lines 105 and 102 to slurry tank 26, or through lines 106 and 98 to second reactor 84 or through lines 107, 104 and 92 to first reactor 41. The liquid from the base of these settlers, particularly from the base of cool settler 56, may be a desirable medium for making up the aluminum chloride slurry in tank 26. Alternatively I may return recycled isomerization products, chiefly methyl pentanes, from line 82 through lines 108 and 102 for making up the aluminum chloride slurry in tank 26. Instead of recycling isomerized products for making up the aluminum chloride slurry I may pre-treat with aluminum chloride that portion of the charging stock with which the slurry is to be made up since a slurry made with such pre-treated charging stock is more stable than a slurry made with untreated charging stock.

Spent sludge may be discarded from the system but I prefer to introduce it into drum 95 and to add to the sludge in this drum through line 109 a sufficient amount of sulfuric acid or water to effect recovery of anhydrous hydrogen chloride. The recovered hydrogen chloride is passed through line 110 to line 29 and absorber 24. The sulfuric acid sludge or cokey residue is withdrawn from drum 95 through line 111. If water is employed it should be used in less than stoichiometric amounts in order that the recovered hydrogen chloride may be substantially anhydrous; the sludge will thereupon be converted into a cokey mass that may be removed from the drum by hydraulic or other conventional decoking means. A larger amount of anhydrous hydrogen chloride may be recovered by the use of sulfuric acid and the resulting sulfuric acid sludge may be charged to a conventional sludge coker system for the recovery of sulfuric acid. Spent sulfuric acid from an alkylation system is an excellent medium for this hydrogen chloride recovery step.

Instead of employing relatively pure hydrogen from source 42 I may obtain hydrogen from refinery gases which are rich in hydrogen. Such gases may be introduced through line 112 to absorber 113 which may operate at about 100° F. under a pressure of about 900 pounds per square inch. Absorber oil may be butane from line 29 and line 114. Such oil may be introduced by pump 115 through line 116 to the upper part of the absorber tower for picking up the methane, ethane, ethylene, propane, propylene, etc. in the refinery gases. The unabsorbed hydrogen will pass overhead through line 117 to be picked up by compressor 43. The rich absorber oil will pass through line 118 and pressure reducing valve 119 to receiver 120 from which the hydrocarbon gases may be vented to fuel lines or other parts of the refinery through line 121 and the denuded oil may be returned by line 122, pump 115 and line 116 back to the top of the absorber.

The plant hereinabove described is designed to produce approximately 98 volume percent yields of butane-free high octane number isomate. A comparison of a charging stock with the resulting isomate is substantially as follows:

|  |  | Charge | Isomate |
|---|---|---|---|
| Initial boiling point | ° F | 114 | 97 |
| 10% point | ° F | 118 | 109 |
| 50% point | ° F | 128 | 121 |
| 90% point | ° F | 146 | 145 |
| End point | ° F | 152 | 180 |
| Reid vapor pressure | pounds | 10.2 | 10.7 |
| A. S. T. M. octane number |  | 69 | 81 |
| With 1 cc./gal. lead tetraethyl |  |  | 92 |
| With 2 cc./gal. lead tetraethyl |  |  | 100 |

If the heavier components of the isomate are removed therefrom by fractionation the remainder will have a clear A. S. T. M. octane number within the approximate range of 85 to 90. With 1 cc. of tetraethyl lead per gallon this more volatile isomate will have an octane number of about 95 to 100 and with 3 cc. of tetraethyl lead per gallon this more volatile fraction may have an octane number as high as 105 to 110.

While I have described in detail a specific embodiment of my invention it should be understood that the invention is not limited to the apparatus or operating conditions recited in connection with this specific example. It has already been indicated that warm settler 51 may be an integral part of the reactor and may constitute an upper part of the reactor. Steam jackets, electrical heating means or the like may be employed for maintaining the desired temperature in the reactor and in the warm settler. Instead of introducing make-up aluminum chloride as a slurry I may pre-form make-up catalyst complex and introduce this pre-formed complex into each reactor either with the incoming charging stock or at a point in the reactor above the charging stock inlet. I may recycle hydrogen and hydrogen chloride directly from the top of each reactor to the base thereof and draw off the liquid products from a point in the reactor below the reactor top. The aluminum chloride may be introduced into the system in solution with charging stock or butane or with recycled isobutane instead of as a slurry. These are only examples of the many modifications and alternative operations which may be employed and other modifications and alternatives will be apparent to those skilled in the art from the above detailed description.

A feature of my invention is the means for introducing the hydrogen chloride activator into the reaction system, for preventing build-up of condensible hydrocarbons, and for diminishing hydrogen chloride requirements. Tests have shown that it is desirable to have hydrogen chloride present during the reaction to the extent of at least about 5 to about 30 pounds per barrel of light naphtha charged. However, the amount of hydrogen chloride which disappears either through actual consumption during the reaction, loss in the wash tower, etc. is very low and never exceeds about 0.5 pound per barrel of stock charged, and is usually about 0.3 pound per barrel or less, so that a very considerable portion of the original hydrogen chloride charged will be found in the off-gases from product recovery system.

My method of recovering the hydrogen chloride has many advantages. The off-gases from the settlers and the hydrogen chloride stripping tower will contain not only hydrogen chloride, but varying amounts of gases such as hydrogen, methane, etc. which if allowed to recycle with the hydrogen chloride gases directly to the reaction zone would soon build up in volume to an undesirable extent. I have discovered that by passing all of these gases through an absorber in which the charging stock is used as the "absorber oil," the hydrogen chloride is recovered almost quantitatively while the methane etc. is eliminated from the system. By this procedure, only a very small amount of make-up hydrogen chloride need be added, thus decreasing the cost of operating the process considerably. The process also proceeds more smoothly due not only to the absence of extraneous light gases but also because the hydrogen chloride is introduced into the system in a substantially constant stream, the composition of which can be easily controlled. Moreover, no special regulating equipment is required in order to get the hydrogen chloride into solution in the proper amounts. Absorber 24 is generally quite cool—say, at from 50 to 125° F. at the top and about 100 to 200° F. at the bottom under a pressure of about 200 to 250 pounds per square inch.

Stripper 62 and settler 56 may operate at pressures sufficiently high to overcome the pressure drop in line 29 leading to absorber 24, and no additional compressors will then be required to introduce the recycle gases into the absorber.

Although I have described a preferred embodiment of my invention, it should be realized that this is by way of illustration and not by way of limitation, and that I intend to be limited only as set forth in the appended claims. Various details such as valves, pumps, automatic control devices, etc. have been omitted for the sake of simplicity since those skilled in the art will be fully conversant with such expedients.

I claim:

1. In a hydrocarbon conversion process wherein an aluminum halide catalyst is activated by a hydrogen halide, the method of operation which comprises contacting a hydrocarbon charging stock with an aluminum halide catalyst in the presence of a substantial amount of a hydrogen halide activator in a conversion zone, separating undissolved gases including hydrogen halide and lighter gases from reaction products, stripping dissolved hydrogen halide and lighter gases from the separated products, introducing gases from the separation and stripping steps into the base of an absorption zone, scrubbing said gases with at least a portion of the charging stock in said absorption zone under conditions of temperature and pressure for effecting solution of the hydrogen halide while leaving at least a substantial amount of the lighter gases unabsorbed in said charging stock, venting the lighter unabsorbed gases from the top of said absorption zone in order to prevent a build-up of such gases in the conversion system, and introducing charging stock together with absorbed hydrogen halide from the base of the absorption zone to the conversion zone.

2. The method of claim 1 wherein the conversion zone is maintained at a pressure of at least about 500 pounds per square inch, wherein said separation and stripping steps are effected at a pressure below 300 pounds per square inch, wherein said absorption step is effected at a pressure within the approximate range of 50 to 300 pounds per square inch and wherein the charging stock together with absorbed hydrogen halide from the base of the absorption zone is pumped to reaction pressure and then passed through a heating zone before it is introduced into said conversion zone.

3. The method of claim 1 wherein the stripping step is effected under conditions of temperature and pressure for retaining propane and at least a substantial amount of any ethane that may be present in the stripped liquid products and removing such propane and ethane from such products in a subsequent stabilization step.

4. In a process for the conversion of paraffinic hydrocarbons of the butane to hexane boiling range by means of an aluminum chloride catalyst activated by hydrogen chloride in the presence of hydrogen, the method of operation which comprises maintaining a relatively large body of aluminum chloride catalyst in a conversion zone, introducing hydrogen, hydrogen halide and a charging stock containing substantial amounts of paraffinic hydrocarbons of the butane to hexane boiling range into said conversion zone, withdrawing products and gases from the top of said conversion zone to a separation zone, separating undissolved hydrogen chloride and lighter gases from said products under conditions of temperature and pressure to prevent the removal of any substantial amount of propane from the liquid products, stripping the liquid products under conditions of temperature and pressure to effect removal of dissolved hydrogen chloride and lighter gases without the removal of any substantial amount of propane or heavier hydrocarbons, introducing the gases from the separation and stripping steps into the base of an absorption zone, countercurrently contacting said gases with at least a substantial portion of incoming charging stock in said absorption zone under conditions of temperature and pressure for effecting solution of the hydrogen chloride in said charging stock while leaving at least a substantial amount of the lighter gases unabsorbed, venting the lighter unabsorbed gases from the top of said absorption zone and introducing charging stock together with dissolved hydrogen chloride from the base of said absorption zone into said conversion zone.

5. The method of claim 4 wherein the conversion zone is at a pressure of at least 500 pounds per square inch, wherein the stripping zone is operated at a pressure below about 300 pounds per square inch, wherein the absorption zone is operated at a temperature within the approximate range of 50 to 150° F. and at a pressure within the approximate range of 50 to 300 pounds per square inch and wherein the charging stock and dissolved hydrogen chloride from the base of the absorption zone is pumped to conversion pressure and then heated to conversion temperature before it is introduced into said conversion zone.

6. A method for the conversion of paraffinic hydrocarbons of the butane to hexane boiling range which method comprises introducing at least the major portion of a charging stock which consists essentially of such paraffinic hydrocarbons at the top of an absorption zone at a temperature within the approximate range of 50 to 150° F. and a pressure within the approximate range of 200 to 250 pounds per square inch, introducing hydrogen chloride containing gases at the base of said absorption zone, removing undissolved gases from the top of said absorption zone, pumping the charging stock-hydrogen chloride solution from the base of the absorption zone to a pressure within the approximate range of 800 to 1000 pounds per square inch, heating said solution to a temperature within the approximate range of 200 to 350° F. and introducing said solution into a conversion zone containing a large amount of aluminum chloride catalyst material, introducing hydrogen into said conversion zone in amounts within the approximate range of 100 to 300 cubic feet per barrel of stock charged, contacting charging stock in said conversion zone with said aluminum chloride catalyst material at a space velocity of about .2 to 4 volumes of charging stock per hour per volume of aluminum chloride catalyst material in the conversion zone, removing products and gases from the top of said conversion zone to a separation zone maintained at a temperature within the approximate range of 50 to 150° F. and a pressure within the approximate range of 200 to 250 pounds per square inch, separating undissolved hydrogen chloride and lighter gases from liquid products in said separation zone, passing liquids from said separation zone to a stripping zone operated under a pressure within the approximate range of 200 to 250 pounds per square inch and with a top temperature within the approximate range of 100 to 150° F. and a bottom temperature within the range of 300 to 400° F., returning hydrogen chloride and lighter gases from said stripping zone and from said separation zone to the base of said absorber and introducing further amounts of hydrogen chlroide into said absorption zone in amounts sufficient to effect the solution of an amount of hydrogen chloride within the approximate range of 3% to 10% by weight based on total stock charged to the conversion zone.

7. In a process wherein paraffin hydrocarbons containing at least four carbon atoms per molecule are isomerized by passage in admixture with hydrogen chloride under isomerization conditions to a reaction zone containing an aluminum chloride isomerization catalyst, and a hydrogen chloride gas contaminated with other gases is separated from the reaction product in a stripping zone, the combination of steps which comprises introducing said contaminated hydrogen chloride from said stripping zone to the base of an absorption zone, introducing at least a part of said paraffin hydrocarbons at the upper part of said absorption zone, maintaining said absorption zone under sufficient pressure to effect substantial solution of hydrogen chloride in the hydrocarbons therein while leaving at least a substantial portion of the contaminating gases undissolved, venting the undissolved contaminating gases from the top of said absorption zone and introducing the solution of hydrogen chloride in said hydrocarbons from the base of said absorption zone into said reaction zone.

8. In a process wherein paraffin hydrocarbons containing at least four carbon atoms per molecule are isomerized by passage in admixture with hydrogen chloride under isomerization conditions to a reaction zone containing an aluminum chloride isomerization catalyst, and a hydrogen chloride gas contaminated with other gases is separated from the reaction product, the combination of steps which comprises introducing said contaminated hydrogen chloride to the base of an absorption zone, introducing at least a part of said paraffin hydrocarbons at the upper part of said absorption zone, maintaining said absorption zone under sufficient pressure to effect substantial solution of hydrogen chloride in the hydrocarbons therein while leaving at least a substantial portion of the contaminating gases undissolved, venting the undissolved contaminating gases from the top of said absorption zone and introducing the solution of hydrogen chloride in said hydrocarbons from the base of said absorption zone into said reaction zone.

9. In a process wherein paraffin hydrocarbons containing at least four carbon atoms per molecule are isomerized by passage in admixture with hydrogen chloride under isomerizing conditions through a reaction zone containing an isomerization catalyst, activatable by hydrogen chloride, and fixed gases containing hydrogen and hydrogen chloride are separated from the reaction products, the steps which comprise bringing said fixed gases into intimate contact with at least a portion of the hydrocarbon feed to said reaction zone ahead of said reaction zone, under conditions effecting solution of hydrogen chloride in said hydrocarbon feed while leaving a substantial portion of the fixed gases other than hydrogen chloride undissolved, separating said hydrocarbon feed containing the hydrogen chloride from the undissolved portion of said fixed gases and then passing the hydrocarbon feed containing hydrogen chloride to the reaction zone.

10. A process according to claim 9 in which the isomerization catalyst is aluminum chloride.

11. In a process wherein paraffinic hydrocarbons containing at least 4 carbon atoms per molecule are isomerized by passage in admixture with hydrogen chloride under isomerization conditions to a reaction zone containing an aluminum chloride catalyst, and a hydrogen chloride gas contaminated with other gases is separated from the reaction product, the combination of steps which comprises introducing said contaminated hydrogen chloride to the base of an absorption zone, introducing at least a part of said paraffin hydrocarbons at the upper part of said absorption zone, maintaining said absorption zone under conditions of temperature and pressure to effect substantial solution of hydrogen chloride in the hydrocarbons therein while leaving at least a substantial portion of the contaminating gases undissolved, venting the undissolved contaminating gases from the top of said absorption zone and introducing the solution of hydrogen chloride in said hydrocarbons from the base of said absorption zone through a heating zone and thence to said reaction zone.

12. In a process wherein paraffin hydrocarbons containing at least 4 carbon atoms per molecule are isomerized by passage in admixture with hydrogen chloride under isomerization conditions through a reaction zone containing an aluminum chloride isomerization catalyst, the combination of steps which comprises separating from the reaction product a hydrogen chloride gas contaminated with other gases, effecting said separation at a pressure which is not higher than reactor pressure so that there is no pressure increase between the reaction step and the separation step, introducing the separated hydrogen chloride and contaminating gases to the base of an absorption zone at a pressure not higher than the pressure in the separation step so that there is no pressure increase between the separation step and the absorption zone, introducing at least a part of said paraffin hydrocarbons at an upper part of said absorption zone, maintaining said absorption zone under conditions of temperature and pressure for effecting substantial solution of hydrogen chloride in the hydrocarbons therein while leaving at least a substantial portion of the contaminating gases undissolved, venting the undissolved contaminating gases from the top of the absorption zone and pumping the solution of hydrogen chloride in said hydrocarbons from the base of said absorption zone to said reaction zone.

JOSEPH K. ROBERTS.

REFERENCES CITED

The following references are of record in the file of this patent:

UNITED STATES PATENTS

| Number | Name | Date |
|---|---|---|
| 2,100,354 | Pier et al. | Nov. 30, 1937 |
| 2,220,091 | Evering et al. | Nov. 5, 1940 |
| 2,220,092 | Evering et al. | Nov. 5, 1940 |
| 2,300,249 | Evering et al. | Oct. 27, 1942 |
| 2,301,615 | Chenicek et al. | Nov. 10, 1942 |
| 2,310,523 | Groll et al. | Feb. 9, 1943 |